United States Patent [19]

Duffy

[11] Patent Number: 4,828,067
[45] Date of Patent: May 9, 1989

[54] ELECTRONIC POWER ASSIST CONTROL STEERING SYSTEM

[75] Inventor: James J. Duffy, Livonia, Mich.

[73] Assignee: Ford Motor Company, Dearborn, Mich.

[21] Appl. No.: 115,083

[22] Filed: Oct. 30, 1987

[51] Int. Cl.$^4$ .............................................. B62D 5/08
[52] U.S. Cl. ..................................... 180/142; 91/452; 180/143
[58] Field of Search ...................... 180/132, 142, 143; 91/449, 452, 458

[56] References Cited

U.S. PATENT DOCUMENTS

| | | | |
|---|---|---|---|
| 3,901,343 | 8/1975 | Inoue | 180/142 |
| 4,561,521 | 12/1985 | Duffy | 180/142 |
| 4,570,735 | 2/1986 | Duffy | 180/142 |
| 4,570,736 | 2/1986 | Waldorf | 180/143 |
| 4,693,332 | 9/1987 | Miyata et al. | 180/142 |

FOREIGN PATENT DOCUMENTS

| | | | |
|---|---|---|---|
| 71909 | 2/1983 | European Pat. Off. | 180/143 |
| 186135 | 7/1986 | European Pat. Off. | 180/132 |
| 155058 | 7/1986 | Japan | 180/142 |

Primary Examiner—David M. Mitchell
Assistant Examiner—Mitchell J. Hill
Attorney, Agent, or Firm—Donald J. Harrington; Keith L. Zerschling

[57] ABSTRACT

A variable assist power steering gear mechanism for vehicles having primary and secondary steering valve portions, the primary portion controlling pressure in a power steering fluid motor, a steering pressure valve that controls the magnitude of the steering pressure as a function of vehicle speed, a steering torque sensor flow control valve that cooperates with the secondary steering valve portion to develop a steering torque signal, and an electronic signal processor for controlling the steering pressure valve in response to changes in the vehicle speed and the steering torque signal.

5 Claims, 4 Drawing Sheets

ELECTRONIC POWER ASSIST CONTROL STEERING SYSTEM

BACKGROUND OF THE INVENTION

My invention comprises improvements in the invention disclosed in my earlier United States patent application Ser. No. 902,919, entitled "Variable Assist Power Steering System Using Electronic Pressure Control", filed Sept. 2, 1986, (now U.S. Pat. No. 4,760,892 dated Aug. 2, 1988) which is assigned to the assignee of this invention. My earlier disclosure relates to a power steering system having a positive displacement pump driven by a vehicle engine. The pump, as in conventional power steering systems, is a positive displacement pump with a flow control valve that establishes a constant flow delivery regardless of the driven speed of the pump. A driven member, such as a rack in a steering gear linkage mechanism for the dirigible wheels of a vehicle, is actuated by a pinion that is connected to a driver controlled torque input shaft through a torsion bar. The input shaft is connected also to an inner valve member, and the pinion is connected to a valve sleeve surrounding the inner valve member. The relative displacement of the inner valve member relative to the sleeve is proportional to the deflection of the torsion bar.

The rotary valve assembly is situated in and partly defines a pressure distributor circuit between the pump and opposed working chambers of a fluid motor that actuates the steering gear rack.

In my earlier disclosure I have provided a means for distributing the pressure fluid made available to the steering gear rotary control valve assembly using a regulator valve that is under the influence of a solenoid actuator. A vehicle speed sensor and a steering torque sensor provide control signals to a central processor unit in the form of an electronic processor. The output signal from the module is amplified and used to energize the solenoid actuator so that the steering pressure is varied directly in response to changes in steering torque.

A related invention described in my U.S. Pat. No. 4,561,521 includes a variable assist steering gear mechanism that uses a solenoid valve for controlling the rate of flow to an auxiliary valve section of the rotary valve assembly. The auxiliary valve section is in parallel disposition with respect to the main metering valve elements of the rotary valve assembly. The solenoid valve, which responds to engine speed, effects a change in the flow area on the discharge side of the power steering pump. Thus a variable assist is achieved in the assembly shown in U.S. Pat. No. 4,561,521 by varying the flow area on the discharge side of the pump, which in turn controls steering pressure. The result is to effect control of the steering pressure in response to steering torque.

GENERAL DESCRIPTION OF THE INVENTION

My present invention incorporates a valve generally similar to the rotary steering valve disclosed in my U.S. Pat. No. 4,561,521. Another example of a rotary steering valve capable of being used in my present invention is shown in U.S. Pat. No. 4,570,736. Both of these patents are assigned to the assignee of my present invention.

My present invention is distinguishable from the invention of application Ser. No. 902,919 now U.S. Pat. No. 4,760,892 as well as the inventions of U.S. Pat. Nos. 4,561,521 and 4,570,736 because it achieves a steering assist control that is directly proportional to the actual steering torque and vehicle speed but does not require an electronic torque sensor such as that which is required in the invention of Ser. No. 902,919 now U.S. Pat. No. 4,760,892. Although the rotary valve assembly of my present invention incorporates two discrete flow regulating portions as in the case of the inventions of U.S. Pat. Nos. 4,561,521 and 4,570,736, the so-called secondary portion of the rotary valve assembly is not used for the purpose of varying the flow area for the power steering fluid on the discharge side of the pump—rather, it is used to act in cooperation with a steering torque sensor flow control valve that develops a fluid pressure signal that is used as an indicator of steering torque.

The signal made available by the steering torque pressure sensor is used as an input signal for a microprocessor which together with a vehicle speed sensor signal allows the microprocessor to develop an output signal that is used by a steering pressure control solenoid valve. That valve in turn varies the steering effort directly as a direct function of steering torque. The steering torque senor is not used as a means for achieving a variable flow area for the rotary steering valve as in the case of the secondary rotary valve section of inventions of U.S. Pat. Nos. 4,561,521 and 4,570,736. In this way I have achieved a direct control of the steering pressure in response to changing steering torque without the necessity of using a complex electronic torque sensor, and I have done this by using elements that are common to the steering system described in U.S. Pat. Nos. 4,561,521 and 4,570,736. This results in a power assist steering system that is reliable in operation and less costly to manufacture than is the system of my pending patent application Ser. No. 902,919 now U.S. Pat. No. 4,760,892.

PARTICULAR DESCRIPTION OF THE INVENTION

Figure 1A:
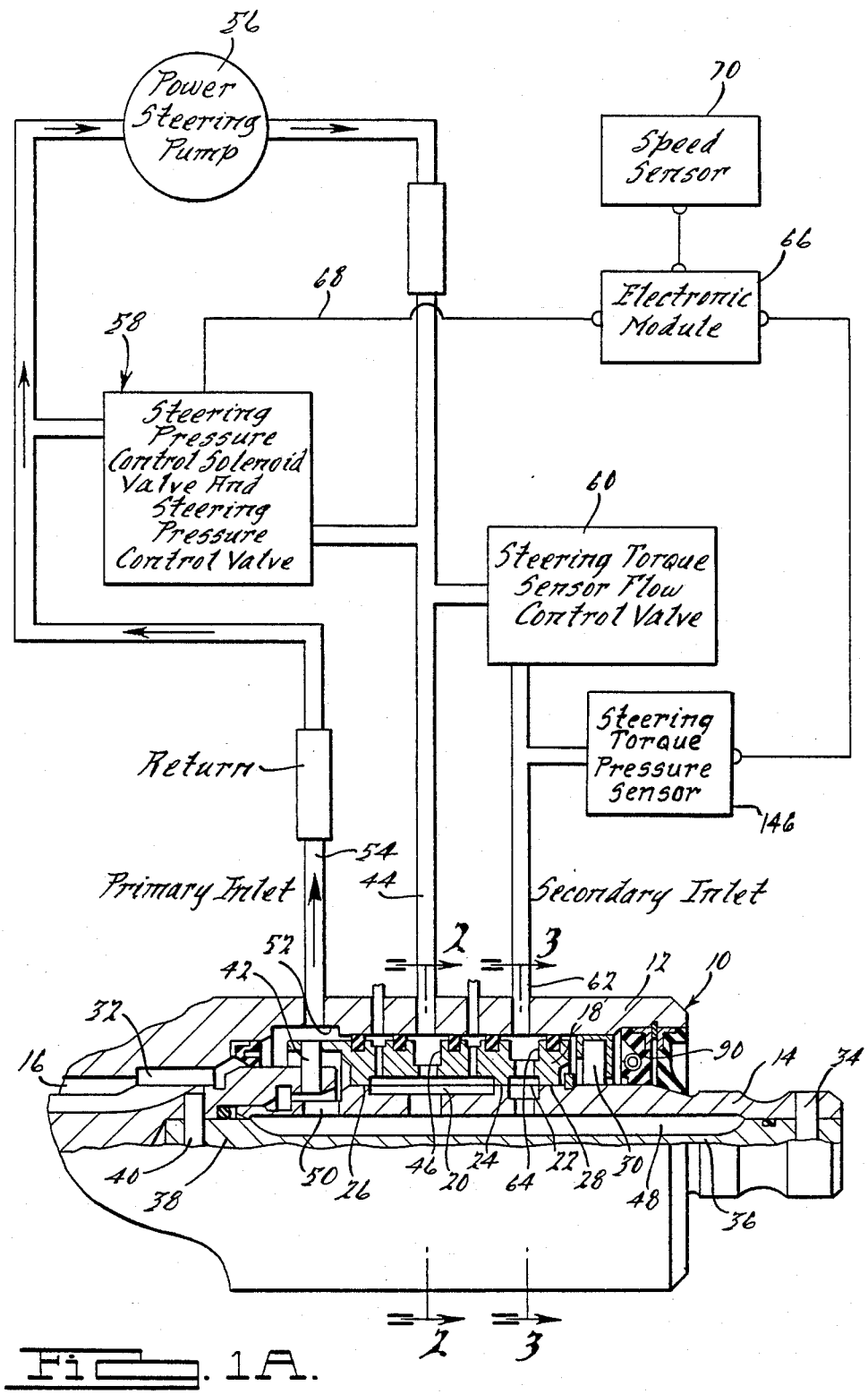
FIG. 1A shows a steering gear assembly including a rotary valve assembly as well as a steering torque sensor flow control valve and a steering pressure control solenoid valve located respectively on the outlet side of the power steering pump and the flow return side of the power steering pump.

In FIG. 1A numeral 10 designates generally a portion of a rotary valve assembly of a steering gear mechanism embodying the improvements of my invention. It includes a rotary valve housing 12, a steering torque input shaft 14 and a steering drive pinion 16. Rotatably mounted within the valve housing 12 is a cylindrical valve sleeve 18 which has two sets of metering valve lands which respectively define a primary section 20 and a secondary section 22. The primary section is separated from the secondary section by sealing rings 24 formed respectively on the valve sleeve and the internal valve element. The primary section 20 is sealed on the axial ends of the metering valve lands by seal rings 24 and registering rings 26. The secondary valve section is sealed on each axial end by a seal ring 24 and seal ring 28. A shaft 14 on which the internal valve lands are formed is journalled at spaced axial locations by bearings 30 and 32 within the valve housing 12.

The input shaft 14 is pinned at 34 to the right hand end of the torsion bar 36. The left hand end of the torsion bar 36, as seen at 38, is pinned to drive pinion 16 by means of a transverse pin 40 which is received in registering openings in the pinion 16 and the torsion bar end 38. Torque applied to the shaft 14 is transferred through the torsion bar 38 to the pinion 16. As the torsion bar deflects due to the applied torque on the shaft 14, the inner valve member rotates relative to the sleeve 18, the sleeve being pinned to the pinion 16 by means of a drive pin 42.

Pressurized fluid is distributed to the rotary valve assembly through high pressure passage 44 which communicates with annular groove 46 in the sleeve 18. Sealing grooves are arranged as seen on either side of the groove 46. Fluid distributed to the groove 46 passes through the registering valve lands of the primary valve section 20 and exits through port 46 to an internal axial flow passage 48. Fluid then exits through port 50 and communicates with low pressure chamber 52 at the left hand end of the valve sleeve. Fluid then passes to the flow return passage 54 and then to the intake side of the power steering pump shown at 56.

Shown schematically in FIG. 1A is a steering pressure control solenoid valve and steering pressure control valve 58 which communicates with both the return passage 54 and the pressure delivery passage 44 of the pump 56. Shown schematically also is a steering torque sensor flow control valve 60 which communicates with the pressure delivery passage 44 as well as with secondary inlet passage 62 which communicates with groove 64 in the valve sleeve, the latter in turn serving as an input passage for the secondary valve section 22.

Electronic microprocessor 66 provides a signal that is distributed to the steering pressure control solenoid valve and steering pressure control valve 58 through control lines 68. The module 66 also senses the pressure in the secondary inlet passage 62.

A vehicle speed sensor 70 provides a signal for the microprocessor 66 as indicated.

Figure 1B:
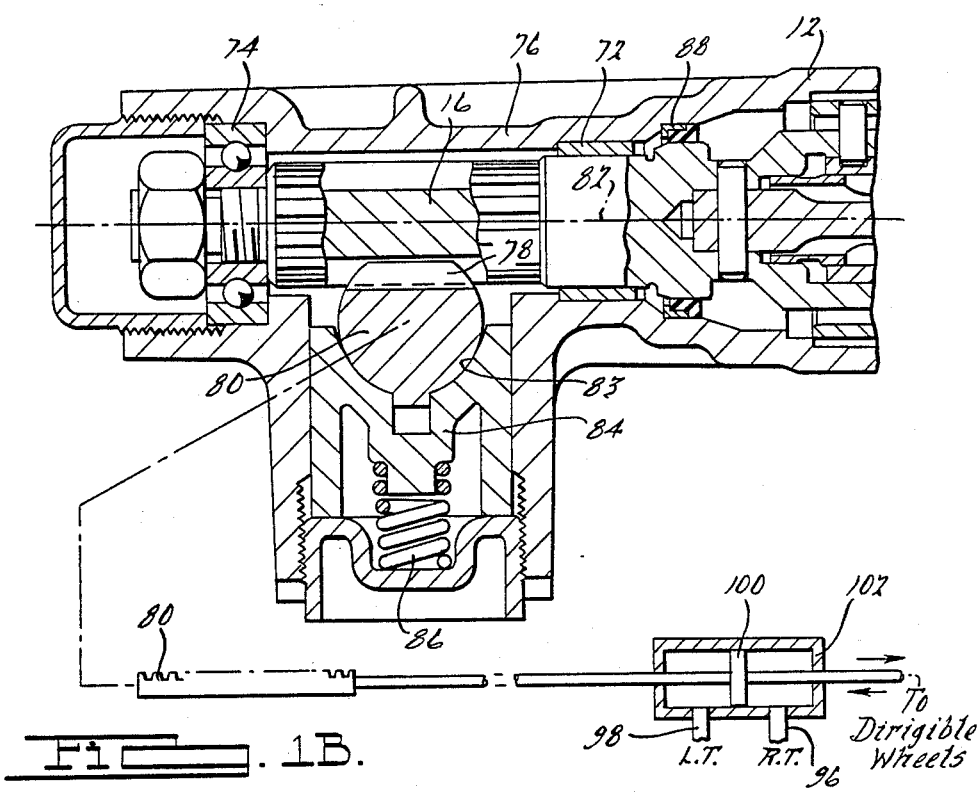
FIG. 1B shows the rack and pinion portion of the steering gear mechanism partially illustrated in FIG. 1A.

In FIG. 1B the pinion 16 is straddle mounted by means of a rear bearing 72 and a front bearing 74 each of which is mounted in steering gear housing 76 which forms a part of the rotary valve housing 12.

The pinion has teeth that engage teeth 78 on a rack 80 which is mounted at a right angle with respect to the axis 82 of the pinion 16. The rack 80 has a rounded lower surface that engages generally semi-circular surfaces 83 of a yoke assembly 84 which is spring loaded by spring 86 in an upward direction, as seen in FIG. 1B, thereby causing the rack 80 to register and mesh with the teeth of the pinion 16 with zero backlash.

Upon rotation of the pinion, the rack reciprocates in the direction of its axis. The rack is connected by means of a steering gear linkage mechanism, not shown, to the dirigible wheels of the vehicle.

Fluid seal 88 separates the rack and pinion assembly from the interior of the rotary valve housing 12. The right hand end of the valve housing 12 is sealed by a valve seal 90 as seen in FIG. 1A.

Figure 2:
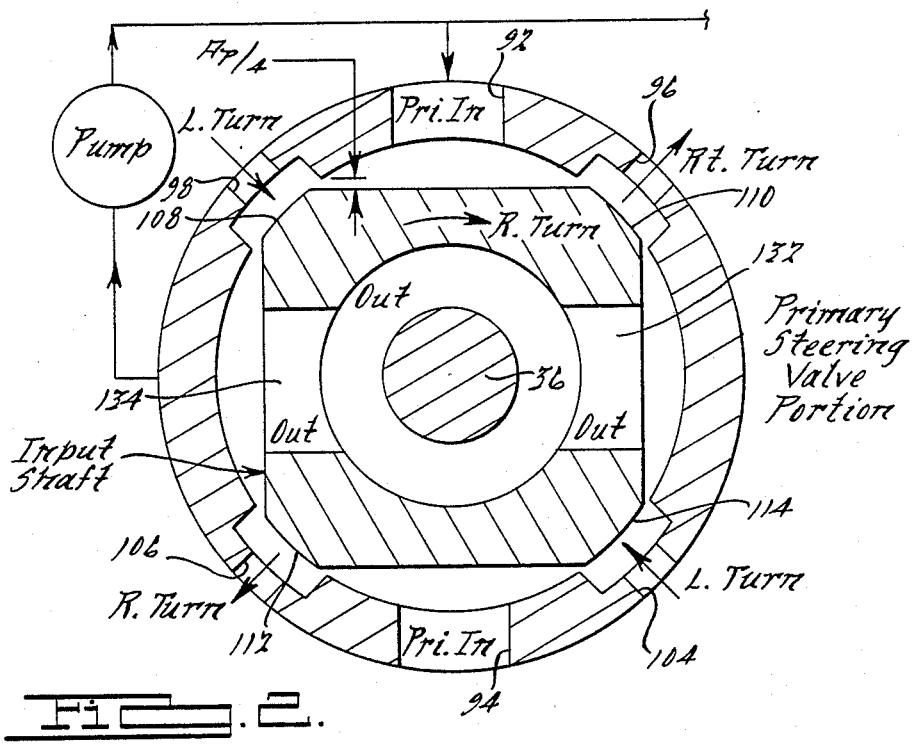
FIG. 2 is a cross-sectional view of the valve assembly of FIG. 1A as seen from the plane of section line 2—2 of FIG. 1A.

FIG. 2 shows the relationship of the internal valve lands and the external valve lands of the primary rotary valve section 20. As seen in FIG. 2 there are two sets of primary valve section inlet ports as seen at 92 and 94. These communicate with the annular groove 46 described with reference to FIG. 1A. Located adjacent port 92 is a right turn pressure delivery port 96 and a left turn pressure delivery port 98. These communicate with opposite sides of a fluid piston schematically illustrated at 100 in FIG. 1B. Piston 100 reciprocates in a fluid motor cylinder 102 which is connected mechanically to the previously described rack 80. The piston 100 is connected also to the steering gear linkages for the dirible wheels.

As shown in FIG. 2, a second set of valve ports 104 and 106 communicates with opposite sides of the piston 100.

The primary valve section 20 may be formed with a generally square cross section as shown in FIG. 2 to define four valve lands 108, 110, 112 and 114. These respectively register with internal valve lands of the valve sleeve adjacent the ports 98, 96, 106 and 104. During a right turn, the inner valve member moves as indicated by the directional arrow of FIG. 2 thereby increasing the degree of communication between the inlet port 92 and the right turn port 96 and decreasing the degree of communication between the left turn port 98 and the inlet port 92. Simultaneously the degree of communication between left turn port and inlet port 94 is decreased and the degree of communication between inlet port 94 and right turn port 106 is increased. During a left turn maneuver, the lands 108, 110, 112 and 114 rotate in the opposite direction and communication between the inlet ports and the left turn ports is increased while the degree of communication between the inlet ports and each of the right turn ports is decreased.

Figure 3:
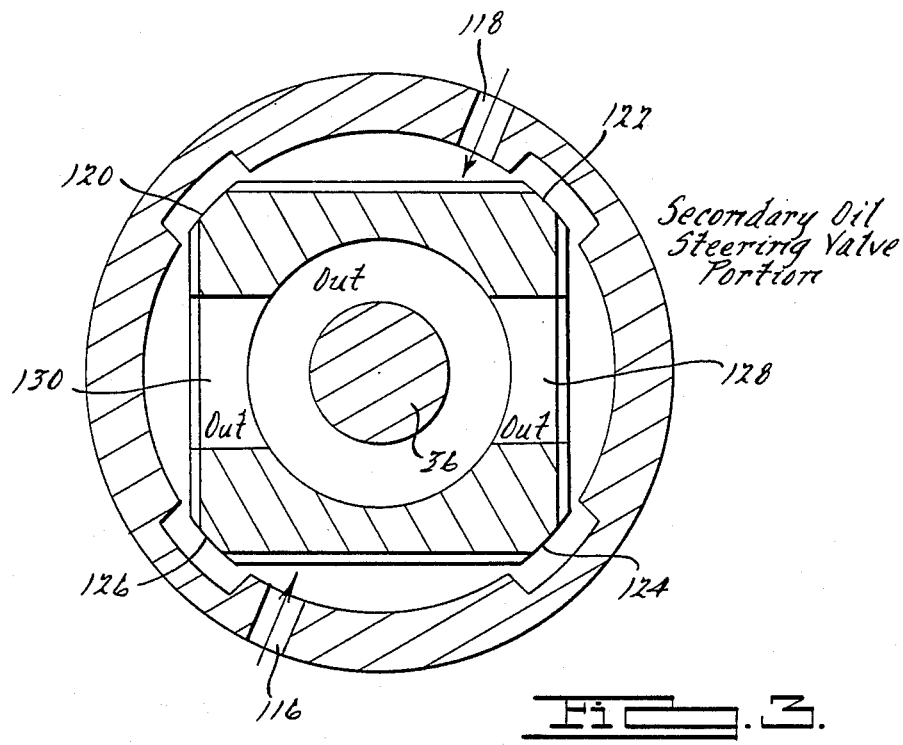
FIG. 3 is a cross-sectional view of the rotary valve mechanism of FIG. 1A as seen from the plane of section line 3—3 of FIG. 1A.

In FIG. 3 there are two secondary inlet ports shown at 116 and 118. Each of these communicates with the annular groove 64 shown in FIG. 1A. The secondary valve section has external valve lands 120, 122, 124 and 126, which form a part of the internal valve member. These register with internal valve lands formed in the valve sleeve 18. The outlet flow path for the fluid distributed to the secondary valve section through the inlet ports 116 and 118 includes outlet ports 128 and 130, which communicate with the axial flow internal passage 48 shown in FIG. 1A. The corresponding outlet flow ports for the primary valve section are shown in FIG. 2 at 132 and 134.

During a right turn maneuver torque is applied to the steering shaft and the internal valve member shown in FIG. 3 moves in the direction of the directional arrow thereby decreasing the degree of communication between inlet port 118 and the outlet port 128 and also decreasing the degree of communication between inlet port 116 and outlet port 130. During a left turn maneuver torque is applied in the opposite direction, and again the degree of communication between inlet port 118 and outlet port 130 is decreased and the degree of communication between inlet port 116 and outlet port 128 is decreased. Thus in each direction of the applied torque the flow path for the fluid through passage 62 of FIG. 1A is restricted.

Figure 4:
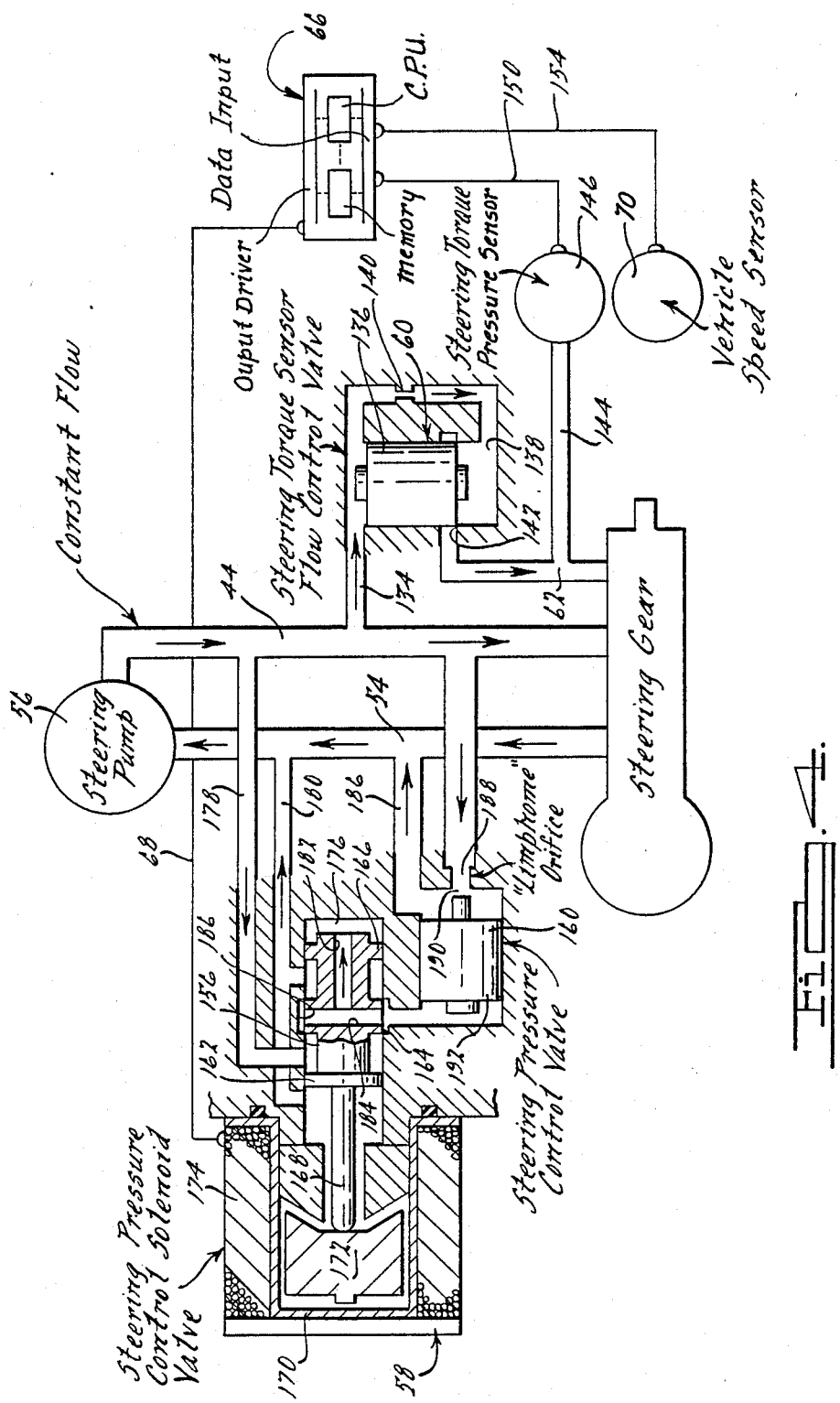
FIG. 4 is a schematic circuit diagram showing the principal elements of the improved valve system of my present invention.

Referring next to FIG. 4, the inlet passage for the secondary valve section as shown at 62 communicates with steering torque sensor flow control valve 60. The outlet side of the pump 56 communicates through passage 44 and through branch passage 134 with one end of a movable valve element 136 of the steering torque sensor flow control valve 60. The opposite end of the steering torque sensor flow control valve has a spring 138 that urges the spool 136 in an upward direction. The opposite ends of the valve spool are connected by a cross-over passage with a control orifice 140.

Valve spool 136 defines a valve land that registers with valve port 142 connected to passage 62. A constant flow thus is distributed from passage 44 to the passage 62. Upon relative displacement of the valve lands of the secondary valve section for the rotary gear steering assembly a pressure is developed in passage 62 which is related directly to the magnitude of the torque applied to the torsion bar. That pressure is distributed through passage 144 to a steering torque pressure sensor 146, which acts as a pressure-to-voltage transducer. It distributes a voltage signal to the central processor unit or microprocessor 66 through control line 150. The microprocessor 66 includes a data input portion, an output portion, a memory portion and a processing portion (CPU).

Vehicle speed sensor 70, which electronically measures the driven speed of the vehicle, distributes a control signal through control line 154 to the microprocessor 66. The output of the microprocessor 66 is distributed through control line 68 to the steering pressure control solenoid valve previously described.

The steering pressure control solenoid 174 and steering pressure control valve assembly 58 comprise a steering pressure control solenoid valve spool 156 and a steering pressure control valve spool 160.

Valve spool 156 comprises spaced lands 162, 164 and 166. It is slidably situated in a valve chamber having internal valve lands that register with the valve lands 162, 164 and 166. The left hand end of the valve spool 156 is connected to or is formed integrally with an armature shaft 168 of a solenoid actuator 170. The actuator 170 comprises a core 172 located within solenoid windings 174. When the windings 174 are energized by the central processor unit 148, the armature 168 and the valve 156 are adjusted in a right hand direction against the opposing force of pressure in valve chamber 176 of the steering pressure control solenoid valve.

Passage 44 on the high pressure side of the pump 56 communicates through passage 178 with the valve chamber for the steering pressure control solenoid valve at a location intermediate lands 162 and 164. Passage 52 which communicates with the low pressure side of the pump 56 communicates through passage 180 with the valve chamber for the steering pressure control solenoid valve at a location adjacent land 162, as shown. It also communicates with the steering pressure control valve chamber at a location intermediate lands 164 and 166, as shown.

The pressure chamber 176 on the right hand side of the valve chamber for the steering pressure control solenoid valve communicates with internal passages 182 and 184 and with annular groove 186 formed in the valve chamber for the steering pressure control solenoid valve, the latter in turn communicating with the left hand side of the valve spool for the steering pressure control valve 160. The right side of the steering pressure control valve 160 communicates through passage 186 with passage 52. It communicates with passage 44 through a flow orifice 188.

The steering pressure control valve controls the degree of bypass flow between passages 44 and 52. It responds to a pressure distributed to it from valve groove 186. Upon an increase in the signal made available to the solenoid windings, the force acting in a right direction is increased. This increases the pressure in the groove 186 which restricts the bypass flow from passage 44 to passage 187. The opposite is true upon a decrease in the signal made available by the microprocessor to the steering pressure control solenoid valve. The steering pressure control solenoid valve thus acts as pilot valve for the steering pressure control valve whereby small forces generate larger hydraulic forces.

In the event of a malfunction of the steering pressure control solenoid valve, the passages 44 and 52 will be connected through the orifice 188, thus assuring at least a minimal pressure differential to develop a minimal steering assist.

Figure 5:
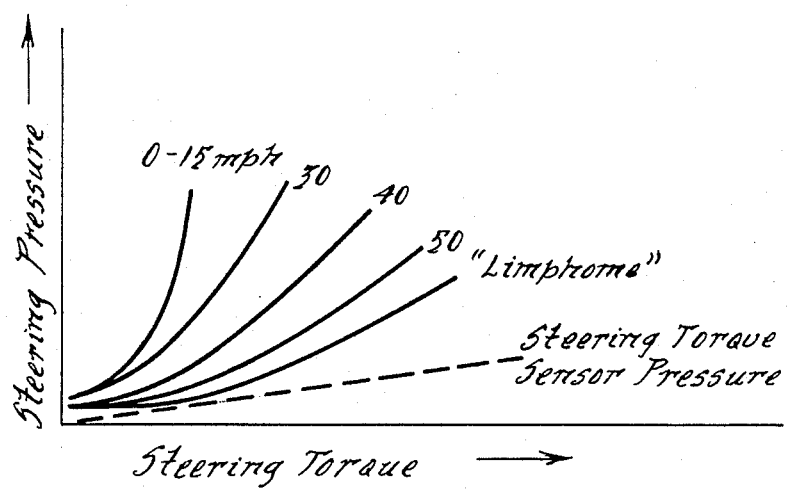
FIG. 5 is a performance chart showing the relationship between steering pressure and steering torque for various vehicle speeds.

With full current distributed to the solenoid—for example, when the vehicle is traveling at a speed between zero miles per hour and 15 miles per hour—the solenoid valve pressure is at a maximum and the steering pressure control valve is closed. The steering and parking efforts then are a function of the regulating characteristics of the pump and primary steering valve. As speed increases above 15 miles per hour, for example, the desired pressure-torque relationships are produced by software in the central processor unit 148. The microprocessor responds to the pressure developed by the steering torque sensor flow control valve and senor 70 to select from the processor the desired steering pressure versus steering torque performance curve. The curves are illustrated in FIG. 5. A separate curve is indicated in FIG. 5 for each of a number of vehicle speeds.

The central processor unit senses steering torque and vehicle speed to control solenoid current, solenoid valve pressure and steering pressure.

The effective valve area on the steering pressure control valve is subjected to the pressure in passage 44 is shown at 190. This area as substantially smaller that the area 192 (e.g., less than half) on the opposite side of the valve 160. This differential area permits the solenoid valve pressure to be approximately one-tenth of the steering pressure thereby reducing the solenoid size and the cost of the solenoid.

The steering torque sensor itself consists only of a flow control valve, as seen in 132, which delivers approximately 3 gallons per minute of constant flow to the secondary valve section. This valve is used only for the purpose of sensing steering torque. It measures torsion bar twist by hydraulically measuring the valve displacement. As the lands of the secondary valve section close upon application of left turn steering torque or right steering torque, a minute constant flow of 0.3 gallons per minute in the pressure sensor provides a pressure that actually indicates the torsion bar twist. That pressure then is used as a torque signal by the processor 66.

Having described a preferred form of my invention, what I claim and desire to secure by U.S. Letters Patent is:

1. A power steering gear system for controlling the dirigible wheels of a vehicle comprising:
   a constant flow fluid pressure pump;
   a gear mechanism having a torque input member adapted to receive driver steering torque and a torque output member adapted to be connected to the dirigible wheels and a fluid motor having a pressure movable member for augmenting steering torque;
   a steering valve assembly having primary and secondary valve portions with registering valve lands that define variable fluid flow areas, and primary valve lands controlling pressure distribution to opposite side of said pressure movable member to provide a pressure steering assist;
   a high pressure passage connecting the flow inlet side of said primary valve portion with the high pressure side of said pump and a low pressure passage connecting the flow outlet side of said primary valve portion with the low pressure side of said pump;
   a steering pressure control valve means for establishing a controlled bypass flow from said high pressure passage to said low pressure passage;
   a steering pressure control solenoid valve means communicating with said high pressure passage and said low pressure passage for establishing a pressure signal, and a pressure signal passage connecting said steering pressure control solenoid valve and said steering pressure control valve whereby the latter responds to said pressure signal to control the bypass flow between said high pressure passage and said low pressure passage;
   a steering torque sensor pressure passage extending from said high pressure passage to the inlet side of said secondary valve portion;
   a steering torque sensor flow control valve means disposed in and forming a part of said steering torque pressure passage for establishing a constant flow to said secondary valve portion;
   an electronic processor unit including a data input portion, an output driver portion and a memory portion, said driver portion being connected to said solenoid valve, said memory portion having stored therein desired functional relationships between steering torque and steering pressure for various vehicle speeds; and
   a steering torque pressure sensor and a vehicle speed sensor connected to the data input portion of said processor unit, said pressure sensor being connected to said steering torque sensor pressure passage.

2. The combination as set forth in claim 1 wherein said steering pressure control valve includes a flow restricting orifice connecting said high pressure passage and said low pressure passage whereby a minimal steering pressure is maintained in said fluid motor means.

3. The combination as set forth in claim 1 wherein said steering pressure control solenoid valve comprises a valve spool and a solenoid with an actuator connected to said valve spool, one side of said valve spool being connected to said pressure signal passage whereby a solenoid force is opposed and balanced by a pressure signal force.

4. The combination as set forth in claim 1 wherein the magnitude of said pressure signal is less than half of the value of the steering pressure in said high pressure passage and wherein the effective area on said steering pressure control valve that is exposed to said steering pressure is less than half of the area on said steering pressure control valve that is exposed to said low pressure passage.

5. The combination as set forth in claim 2 wherein the magnitude of said pressure signal is less than half of the value of the steering pressure in said high pressure passage and wherein the effective area on said steering pressure control valve that is exposed to said steering pressure is less than half of the area on said steering pressure control valve that is exposed to said low pressure passage.

* * * * *